Inventor
René Bidard
By Pierce, Scheffler & Parker
Attorneys

René Bidard

United States Patent Office

3,450,904
Patented June 17, 1969

3,450,904
PROCESS AND APPARATUS FOR TRANSFORMING CALORIFIC ENERGY INTO ELECTRICAL ENERGY ALONG A THERMODYNAMIC CYCLE COMPRISING AT LEAST ONE MAGNETOHYDRODYNAMIC SYSTEM
René Bidard, Paris, France, assignor to Cie Electro-Mecanique, Paris, France, a body corporate of France
Filed Sept. 28, 1965, Ser. No. 490,957
Claims priority, application France, Oct. 16, 1964, 991,685
Int. Cl. H02k 45/00
U.S. Cl. 310—11                                                18 Claims

ABSTRACT OF THE DISCLOSURE

A power plant of the type including a magnetohydrodynamic generator in which the fluid circulated through the generator in a closed loop comprises an emulsion of a liquid metal and a fine bubble gas such as helium. The emulsion may simply be re-cycled as such through the generator after being re-compressed and re-heated, or the liquid metal and gas may be separated after passing through the generator, the liquid then being re-pressurized and reheated, the gas then being passed through a cold source and re-compressed, and the re-heated liquid and re-compressed gas then being passed into an emulsifier from whence it is passed again through the generator to start a new cycle.

---

The present invention relates to an improved process and apparatus for transforming calorific energy into electrical energy along a thermodynamic cycle comprising at least one magnetohydrodynamic system.

The production of electric energy directly by passing a hot ionized gas through a tube and subjecting it to a transverse magnetic field is known. The devices which operate this way are called magnetohydrodynamic generators.

One of the major difficulties in their realization is the necessity of bringing the gas initially to a very high temperature (even if ionizing additives are used) in order to obtain a sufficient electric conductivity of this gas. The presently known materials are hardly sufficient to withstand such temperatures which limits the realizable electric conductivity and hence the power volume that can be attained.

On the other hand, it is also necessary that the temperature at the outlet of the apparatus still be very high so that the conductivity of the gas still is sufficient there. This temperature is much higher than that admissible at the inlet of the classical heat engines which are usually connected with these generators to realize the "mean temperature" of the complete thermal cycle. The result is that it is necessary to provide a temperature drop without the production of useful work between the magnetohydrodynamic generator and the said heat engines, a temperature drop which is rather difficult to expect in heat exchangers (a process which would be rather close to reversibility) due to the too high temperature at their inlet; in most present solutions one is therefore content to realize this temperature drop in the course of an irreversible process by simply supplying heat to the boiler of a classical low-temperature cycle.

The principal object of the present invention, is to eliminate these inconveniences. The method of transforming energy, forming the subject of the invention, can in fact be carried out at a temperature which is much lower than that necessary for the ionization of the gas. It consists in evolving along a part at least of any thermodynamic cycle, comprising at least one magnetohydrodynamic system, and at least in the interior of this device or of one of them, a complex fluid comprising at least one liquid of good electric conductivity and of a gas, suitably selected and thoroughly mixed, but coexisting individually in the form of an emulsion consisting of fine gas bubbles distributed uniformly in the liquid.

For carrying out the invention, the complex fluid must be formed by an emulsion of fine gas bubbles suspended in the liquid, not of drops suspended in a gas. It must be physically and chemically stable at the anticipated pressures and temperatures. The gas must be little soluble in the liquid at the temperatures and pressures involved. The liquid must have a good electric conductivity and its vapor pressure must be lower at any point than the pressure of the gas at the temperature involved, so that no boiling is produced. In fact, any boiling of the liquid, or vice versa any condensation of its vapor disturb the evolution of the complex fluid and make it difficult to realize a suitable temperature interval in the course of the evolution, while the use of gas of another nature according to the invention is free of this inconvenience. This liquid must no longer solidify at the lowest temperature. A liquid metal can be used. Finally, additional products can be used, if desired, wetting products, for example, to enhance the stability of the emulsion.

In such a complex fluid, the role of the liquid is principally to serve as a support for the electric current, but it also takes part in the enthalpy variations by its contacts with the gas and its heat exchanges with it.

The role of the gas is to be the principal seat of the work produced or absorbed; this means that it entrains the liquid or is entrained by it, depending on the direction of circulation of the energy with regard to the outside.

The gas can be a little conductive and the liquid a little compressible without departing from the spirit of the invention.

Such a complex fluid behaves like a simple fluid having intermediate physical properties between those of its components. During an expansion, for example, there is a certain sliding between the liquid and the gas, the bubbles of the latter preceding the liquid in the direction of motion.

But if the gas bubbles are sufficiently fine and uniformly distributed in the liquid, this sliding is rather reduced so that the resulting losses are of the same order of magnitude as those of a classical heat engine, a turbine, for example. If such an emulsion is expanded in a magnetohydrodynamic tuyere, the conductive liquid will be entrained by the gas in the magnetic field and will thus be the seat of an electric current.

For a suitable selection of the liquid and of the gas, this complex fluid can, while remaining stable, evolve between highly different temperaures without requiring the very high temperatures necessary to produce the ionization of the gas. Thus the above mentioned inconveniences of the presently known devices are eliminated.

There are numerous embodiments of magnetohydrodynamic devices with gaseous fluids (depending on the form of the magnetic field and of the electrode, as well as their relative arrangements). The method according to the invention can be used with any of these embodiments, since it suffices to circulate an emulsion instead of an ionized gas. It can be used in plants operating with numerous cycles. Some of them are illustrated schematically in the accompanying drawings by means of diagrams.

Figure 1:
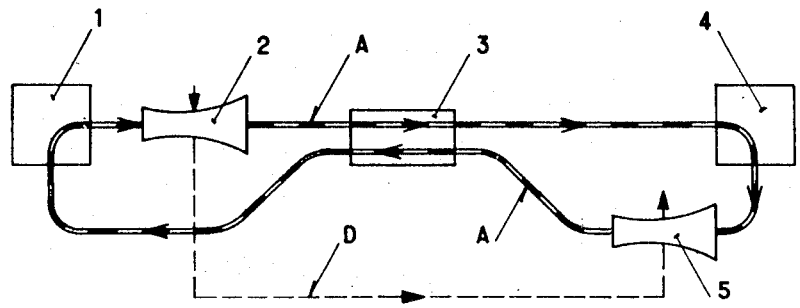
FIG. 1 represents a complete thermodynamic cycle comprising only the magnetohydrodynamic devices for the expansion at high temperature and for the compression at low temperature.

In FIGURE 1, 1 designates the heat source, 2 the device where the expansion is effected, 3 a heat exchanger, 4 the cold source, and 5 the device where the compression is effected. In addition, A designates the circulation of the complex fluid and D that of the electric current between the devices 2 and 5. The device 2 is a magnetohydrodynamic generator. The device 5 is a magnetohydrodynamic compressor. Its operation is inverse to that of the generator 2 in that the complex fluid is set there in motion in a suitable tuyere by reaction with electromagnetic field forces, by supplying it from the outside with suitable electric energy.

In the figure, the two magnetohydrodynamic systems are indicated very schematically as being connected electrically in series. In this case, the useful voltage at the terminals of the assembly is U-u, U being the electromotive force of the generator 2 and u being the counter-electromotive force of the compressor 5. But these two systems could be connected in parallel. In this case the useful electric current supplied by the assembly would be the difference between the current I, produced by the generator, and the current i absorbed by the compressor.

In a variant, the invention permits to realize the single high-temperature part of a complete cycle according to the closed cycle represented schematically in FIG. 1, and to connect the latter to a classical cycle with a lower temperature. The connection is effected by the cold source 4 of the partial high-temperature cycle, which becomes the hot source of the partial low-temperature cycle. The heat exchanger 3 can be eliminated under certain circumstances.

An important case is that where the initial heat supply comes from a nuclear reactor. It is then of interest that at least one of the two fluids composing the emulsion, or the emulsion itself, can circulate in the nuclear reactor. In this case, the fluid or fluids must have as small a cross-section as possible for capturing the neutrons. Sodium or a sodium-potassium alloy as a liquid, and helium as a gas maintained in its gaseous state, i.e., not condensed at any part of the cycle to its liquid state are fluids which can be used in this case for the formation of the desired emulsion.

An interesting variant of the preceding cycle consists in circulating the above mentioned complex fluid only in the magnetohydrodynamic systems which comprise the cycle, in separating it then into its constituents (for example, in a centrifugal separator), in bringing them separately to the initial pressure and at least one of them to the initial temperature, in forming again the emulsion and so forth.

Figure 2:
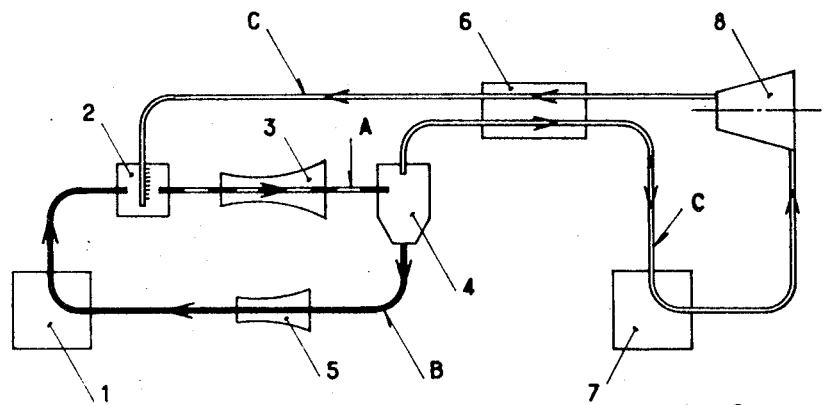
FIGURES 2 to 9 show modifications of FIGURE 1 in which the exhaust from the generator is separated into its gas and liquid components for separate treatment thereof followed by mixing again upstream of the generator.

FIG. 2 shows a complex cycle where this variant is carried out in the high-temperature part. It is composed of two partial cycles. The first comprises a heat source or boiler 1, an emulsifier 2, a magnetohydrodynamic generator 3, a separator 4, and a pump 5.

After the expansion in the generator 3, the complex fluid passes into the separator 4 where the liquid B and the gas C are separated. The conductive liquid, which is still hot, traverses then only the return circuit from the separator 4 to the emulsifier 2, a circuit in which its temperature and pressure are brought to the maximum values of the cycle. To this end the liquid is passed into a pump 5 which brings its pressure to its initial value, then returns it to the heat source 1 to be reheated there (or vice versa if the pump is placed between the heat source and the emulsifier). It passes then into the emulsifier 2 where the hot gas under pressure is re-injected. The emulsion obtained flows into the generator 3 and so forth for the liquid.

The second partial cycle, that of the gas, comprises a heat exchanger 6, a cold source or cooler 7, a compressor 8 and in common with the first partial cycle the emulsifier 2, the generator 3 and the separator 4. The gas traverses only the return circuit from the separator 4 to the emulsifier 2, a circuit in which its pressure is brought to its maximum value. In the emulsifier 2 it is re-injected into the hot liquid and so forth.

Figure 3:
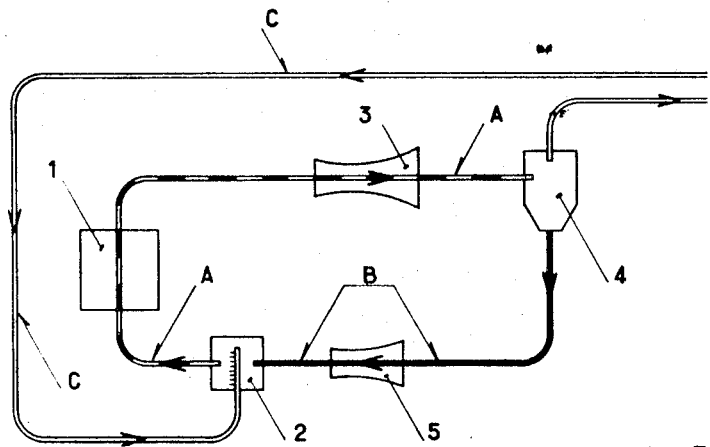

In a variation of this arrangement, the emulsifier 2 can be placed just up-stream, i.e., in advance of the heat source, as shown in the partial FIG. 3. The emulsifier 2 realizes then the mixture of a gas and of a liquid having less different temperatures, which improves the thermal yield of the cycle.

Figure 4:
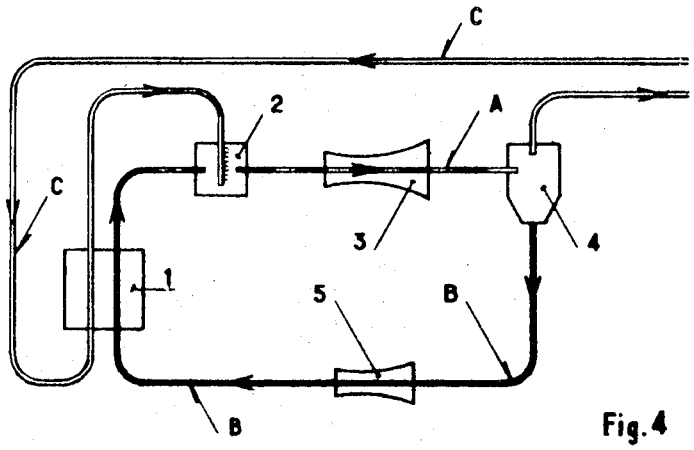

In another variant, and in order to obtain this same improvement, the cycle of FIG. 2 can be modified as indicated in the partial FIG. 4 by re-heating the gas and the liquid separately in the boiler 1 in order to raise their temperature to the same value as the emulsion.

Figure 5:
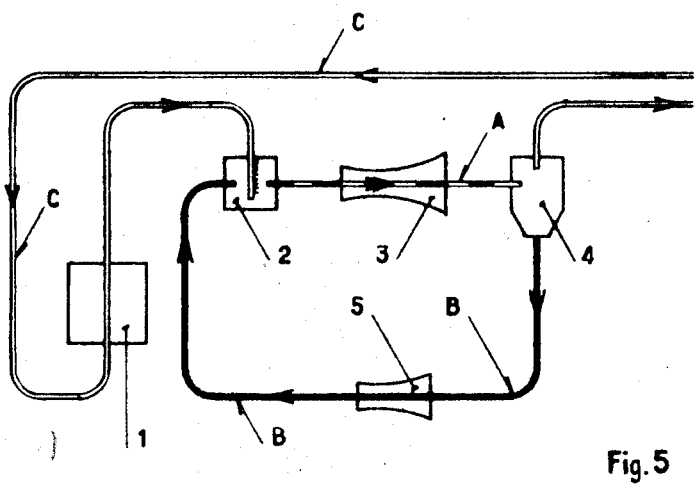

Finally, another variant, illustrated in FIG. 5, which can be preferable if the heat source is a nuclear reactor, consists in reheating only the gas so that it serves to heat the liquid at the time when the emulsion works.

These variations of the method according to the invention, in which the complex fluid traverses only a part of the cycle, have the following advantages with regard to the total use of this fluid:

For a given exchanger, the yield is better, because it is not necessary to remove from the cold source the calories corresponding to the temperature differences of the liquid part composing the complex fluid.

The exchange surfaces are less onerous because they do not have to treat an emulsion.

The complex fluid is regenerated each time at the head of the cycle and the quality of the emulsion is thus ensured.

An inconvenience of these variants is the necessity of supplying mechanical energy both to the pump for the liquid and to the compressor for the gas. This can be avoided by providing on the return loop of the liquid, which is electrically conductive according to the invention, a magnetohydrodynamic pump.

For the gas and for the same purpose it suffices to constitute a third partial cycle using again a complex fluid: a loop of conductive liquid at low temperature is established this time, and the gas is injected there to obtain an emulsion, which can then be compressed in a magnetohydrodynamic compressor.

Figure 6:
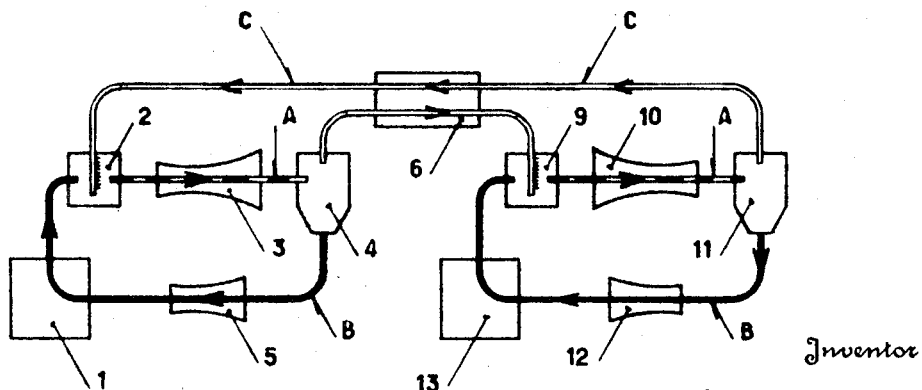

FIG. 6 shows the diagram of the cycle thus obtained from that of FIG. 2. The complex fluid formed in the emulsifier 9 flows into a magnetohydrodynamic compressor 10, then into a separator 11. From there the compressed gas parts toward the exchanger 6 and the emulsifier 2 while the liquid is expanded in a hydraulic turbine or in a magnetohydrodynamic device 12. It passes then into a cooler 13 and arrives in the emulsifier 9, where its cycle is closed.

It goes without saying that the composition of the complex fluid used in the magnetohydrodynamic compressor can be different from that retained on the high-temperature side for the magnetohydrodynamic generator: the choice of the liquid and of the gas portion is made in each case keeping in mind the temperature and the pressure for optimum operation.

Several variations are possible for this third partial cycle, depending on whether the cooler is arranged in the path of the liquid only (FIG. 6) or in the path of the emulsion between the emulsifier 9 and the compressor 10, or whether the gas is cooled separately and parallely, on the one hand, and the liquid, on the other hand, before they are introduced into the emulsifier 9, or whether the gas alone is cooled.

On the other hand, the devices 5 and 12 of the complete cycle, which act on the conductive liquid and which can consist either of magnetohydrodynamic systems or of classical machines (turbine and pump) have almost equal power with almost equal losses, and opposite signs. It is thus possible by a suitable electrical or mechanical coupling to supply only a low energy to the assembly.

Figure 7:
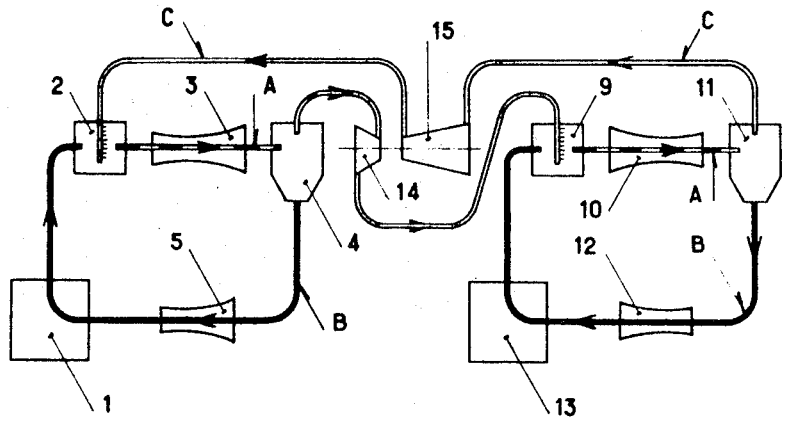

FIG. 7 shows a variant of the preceding cycle in which the heat exchanger 6 is replaced by an assembly of turbine 14 and compressor 15. This cycle is susceptible of the same variants as those described with regard to FIG. 2. It is very close to a Carnot cycle, the compressions and expansions of the magnetohydrodynamic systems with a complex fluid according to the invention being very close to the isotherm and the compressions and expansions of the gas alone being substantially adiabatic. This cycle has the inconvenience of requiring very high pressure ratios and of using rotating machines with a gas of high temperature.

Figure 8:
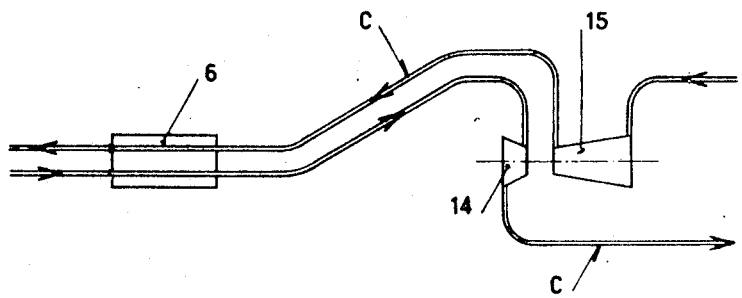

FIG. 8 shows another variant of the cycle according to FIG. 6 in which the heat exchanger 6 is partly preserved but connected to an assembly of turbine 14—compressor 15. This solution can be preferred when the high temperature of the cycle is too high for rotating machines and when high pressures on the high-temperature side are desirable (for example, in order to avoid boiling of the liquid), while low pressures are desirable on the cold source side.

Figure 9:
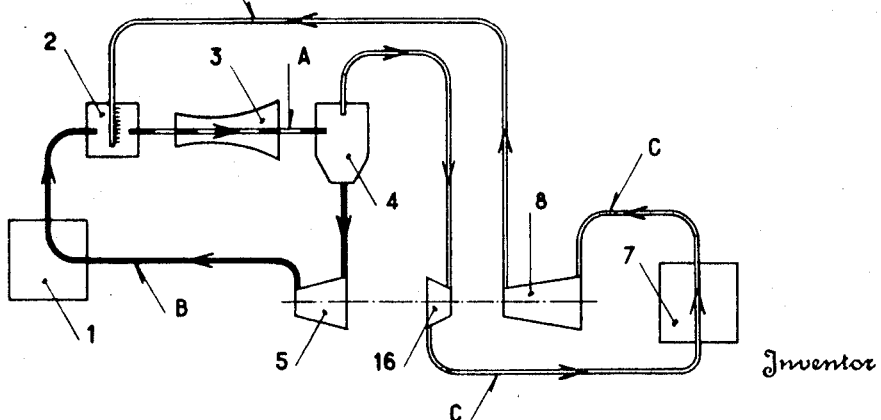

Finally FIG. 9 shows schematically a simplified cycle derived from that of FIG. 2. It comprises only a single magnetohydrodynamic system, which is the generator 3. The pump 5 is a rotating machine. The exchanger 6 is eliminated. The compressor 8 is driven by a gas turbine 16 which drives at the same time the pump 5. Preferably the assembly is so arranged that the rotating group thus formed does not take any energy from the outside. This cycle, while greatly simplified, permits nevertheless a substantial improvement in the simple cycles of combustion turbines, due to the fact that the heat supply is effected at high temperature and the first useful part expanded there is thus closer to the isotherm.

I claim:

1. In the method of transforming calorific energy into electrical energy by means of a thermodynamic cycle which incorporates at least one magnetohydrodynamic generator, the improvement which comprises the step of circulating through said cycle and generator a hot complex fluid having as its constituents a liquid of good electrical conductivity and a non-condensing gas thoroughly mixed with said liquid, said liquid and gaseous constituents co-existing separately in the form of an emulsion and said gaseous constituent consisting of fine gas bubbles distributed uniformly in the liquid.

2. The method as defined in claim 1 for transforming calorific energy into electrical energy which comprises the further steps of separating said complex fluid into its liquid and gaseous constituents at at least one part of said thermodynamic cycle, separately re-compressing said constituents to restore them to their initial pressures, and thereafter re-combining said pressure-restored constituents to re-establish said complex fluid.

3. The method as defined in claim 1 for transforming calorific energy into electrical energy wherein the liquid constituent of said emulsified complex fluid is a metal or metal alloy whose vapor pressure at all points is much smaller than the total pressure prevailing in the complex fluid.

4. The method as defined in claim 1 for transforming calorific energy into electrical energy wherein said gaseous constituent of said emulsified complex fluid has some solubility in the liquid constituent at the temperatures and pressure prevailing in the thermodynamic cycle.

5. Apparatus for transforming calorific energy into electrical energy which comprises a closed thermodynamic circuit in part of which is circulated a complex fluid in the form of an emulsion whose constituents are an electrically conductive liquid and fine bubbles of a non-condensing working gas uniformly distributed through the liquid, said circuit including a heat source, a magnetohydrodynamic generator located downstream from said heat source and in which the calorific energy of said complex fluid is converted into electrical energy, a heat exchanger located downstream from said generator, a cold source located downstream from said heat exchanger, and a compressor returning the complex fluid from said cold source through said heat exchanger to said heat source.

6. Apparatus as defined in claim 5 wherein said compressor is of the magnetohydrodynamic type.

7. Apparatus for transforming calorific energy into electrical energy which comprises a closed thermodynamic circuit in part of which is circulated a complex fluid in the form of an emulsion whose constituents are an electrically conductive liquid and fine bubbles of a non-condensing working gas uniformly distributed through the liquid, said circuit including a heat source, a magnetohydrodynamic generator located downstream from said heat source and in which the calorific energy of said complex fluid is converted into electrical energy, a separator located downstream from said generator for separating said complex fluid into its liquid and gaseous constituents, a pump receiving liquid from said separator and returning it to said heat source, a heat exchanger receiving gas from said separator and passing the gas to a cold source, a compressor receiving the gas from said cold source and passing it back through said heat exchanger, and an emulsifier unit located in advance of said generator to which is fed the liquid after leaving said pump and the gas after being passed back through said heat exchanger for recombining the same into an emulsion state.

8. Apparatus as defined in claim 7 for transforming calorific energy into electrical energy wherein said emulsifier unit is located between said heat source and said generator.

9. Apparatus as defined in claim 7 for transforming calorific energy into electrical energy wherein said emulsifier unit is located between said pump and heat source.

10. Apparatus as defined in claim 7 wherein said pump is constituted by a pump of the magnetohydrodynamic type.

11. Apparatus as defined in claim 7 wherein said gas after being passed back through said heat exchanger is passed through said heat source prior to entering said emulsifier unit.

12. Apparatus for transforming calorific energy into electrical energy which comprises a closed thermodynamic circuit in part of which is circulated a complex fluid in the form of an emulsion whose constituents are an electrically conductive liquid and fine bubbles of a non-condensing working gas uniformly distributed through the liquid, said circuit including a magnetohydrodynamic generator in which the calorific energy of said complex fluid is converted into electrical energy, a separator located downstream from said generator for separating said complex fluid into its liquid and gaseous constituents, a pump receiving liquid from said separator and returning it to said generator, a heat exchanger receiving gas from said separator and passing the gas to a cold source, a compressor receiving the gas from said cold source and passing it back through said heat exchanger, an emulsifier unit located in advance of said generator to which is fed the liquid after leaving said pump and the gas after being passed back through said heat exchanger for recombining the same into an emulsion state, and a heat source through which said gas is passed prior to entering said emulsifier unit.

13. Apparatus for transforming calorific energy into electrical energy which comprise a closed thermodynamic circuit in part of which is circulated a complex fluid in the form of an emulsion whose constituents are an electrically conductive liquid, and a non-condensing working gas in the form of fine bubbles uniformly distributed through the liquid, said circuit including a heat source, a magnetrohydrodynamic generator located downstream from said heat source and in which the calorific energy of said complex fluid is converted into electrical energy, a separator located downstream from said generator for separating said complex fluid into its liquid and gaseous constituents, a pump receiving liquid from said separator and returning it to said heat source, a turbine driving a compressor, said turbine receiving the gas from said separator, a cold source receiving the gas after discharge from said turbine, said compressor receiving the gas from the discharge of said cold source, and an emulsifier unit located in advance of said generator to which is fed the liquid after leaving said pump and the gas after being discharged from said compressor for recombining the same into an emulsion state.

14. In the method of transforming calorific energy into electrical energy by means of a thermodynamic cycle which includes magnetohydrodynamic machines, the improvement which comprises the steps of circulating through a magnetohydrodynamic generator a hot complex fluid having as its constituents a first electrically conductive liquid circulating in a first closed loop and a non-condensing gas thoroughly mixed with said liquid, said liquid and gaseous constituents co-existing separately in the form of an emulsion and said gaseous constituent consisting of fine bubbles distributed uniformly in the liquid, separating said liquid and gaseous constituents after passing through said magnetohydrodynamic generator, pumping the separated liquid back to the inlet side of said magnetohydrodynamic generator and restoring its pressure and temperature, combining the separated gas with a second electrically conductive liquid circulating in a second closed loop to establish a second complex fluid, passing said second complex fluid through a magnetohydrodynamic compressor to raise its pressure, separating said second liquid from said gas after passing said second complex fluid through said magnetohydrodynamic compressor, expanding said second liquid following separation from said gas to do useful work, and recombining said gas following separation from said second liquid with said first liquid at the inlet side to said magnetohydrodynamic generator.

15. Apparatus for transforming calorific energy into electrical energy which comprises a thermodynamic circuit through part of which is circulated a complex fluid in the form of an emulsion whose constituents are an electrically conductive liquid and a non-condensing working gas in the form of fine bubbles uniformly distributed through the liquid, said circuit comprising; a first circulating loop in which a certain amount of said conductive liquid circulates in a closed path, said loop including a heat source, a first emulsifier unit, a magnetohydrodynamic generator located downstream from said heat source and emulsifier unit and in which the calorific energy of said complex fluid is converted into electrical energy, a first separator located downstream from said generator for separating said complex fluid now expanded into its liquid and gaseous constituents, and a pump receiving liquid from said first separator and returning it to said heat source for recirculation; and a second circulating loop through part of which said gas passes after leaving said first separator and prior to again entering said first emulsifier unit, said second circulating loop serving to circulate a second electrically conductive liquid at a much lower temperature than that of the liquid flowing in said first circulating loop and including a second emulsifier unit receiving the gas from said first separator to establish an emulsion with said second liquid, a magnetohydrodynamic unit functioning as a compressor located downstream from said second emulsifier unit and in which the emulsion is compressed through the action of electrical energy, a second separator located downstream from said magnetohydrodynamic unit for separating said gas from said second liquid, and an expansion unit such as a hydraulic turbine or magnetohydrodynamic generator receiving the second liquid from said second separator and returning it to said second emulsifier unit through a cold source, the gas discharged from said second separator being delivered to said first emulsifier unit in said first circulating loop.

16. Apparatus as defined in claim 15 for transforming calorific energy into electrical energy and which further includes a heat exchanger located intermediate said first and second circulating loops and through which is passed in heat exchange relation the gas flowing from said first separator to said second emulsifier unit and the gas flowing from said second separator to said first emulsifier unit.

17. Apparatus as defined in claim 15 for transforming calorific energy into electrical energy and which further includes a coupled turbine and compressor assembly located intermediate said first and second circulating loops, said turbine being located in the gas flow between said first separator and said second emulsifier unit and said compressor being located in the gas flow between said second separator and said first emulsifier unit.

18. Apparatus as defined in claim 15 for transforming calorific energy into electrical energy and which further includes a heat exchanger and a coupled turbine and compressor assembly located intermediate said first and second circulating loops, said heat exchanger having passed therethrough in heat exchange relation the gas flowing from said first separator to said second emulsifier unit and the gas flowing from said second separator to said first emulsifier unit, said turbine being located in the gas flow between said first separator and said second emulsifier unit and said compressor being located in the gas flow between said second separator and said first emulsifier unit.

References Cited

UNITED STATES PATENTS 3,294,989   12/1966   Eichenberger _____ 310—11

DAVID X. SLINEY, *Primary Examiner.*